(12) United States Patent
Kamitani et al.

(10) Patent No.: US 11,325,637 B2
(45) Date of Patent: May 10, 2022

(54) STEERING SYSTEM AND METHOD FOR MANUFACTURING THE SAME

(71) Applicant: JTEKT CORPORATION, Osaka (JP)

(72) Inventors: Yasunori Kamitani, Fujimi (JP); Gaku Takimoto, Fujimi (JP)

(73) Assignee: JTEKT CORPORATION, Kariya (JP)

(*) Notice: Subject to any disclaimer, the term of this patent is extended or adjusted under 35 U.S.C. 154(b) by 0 days.

(21) Appl. No.: 17/146,650

(22) Filed: Jan. 12, 2021

(65) Prior Publication Data

US 2021/0221424 A1     Jul. 22, 2021

(30) Foreign Application Priority Data

Jan. 22, 2020 (JP) .............................. JP2020-008434

(51) Int. Cl.
| | |
|---|---|
| *B62D 1/185* | (2006.01) |
| *F16H 57/04* | (2010.01) |
| *B62D 1/20* | (2006.01) |

(52) U.S. Cl.
CPC ............... *B62D 1/185* (2013.01); *B62D 1/20* (2013.01); *F16H 57/0427* (2013.01)

(58) Field of Classification Search
CPC ...... B62D 1/185; B62D 1/20; B23K 26/0823; B23K 26/083; B23K 26/362; B23K 26/364; F16H 57/0424; F16H 57/0426; F16H 57/0427; F16D 3/06; F16D 3/185; F16D 2300/06

See application file for complete search history.

(56) References Cited

U.S. PATENT DOCUMENTS

| | | | |
|---|---|---|---|
| 6,280,339 B1 * | 8/2001 | Yaegashi | F16C 3/03 464/162 |
| 7,741,256 B2 * | 6/2010 | Kasahara | C10M 119/22 508/181 |
| 8,753,215 B2 * | 6/2014 | Tokioka | F16C 3/035 464/162 |
| 9,771,969 B2 * | 9/2017 | Tokioka | B62D 1/20 |
| 2008/0010830 A1 | 1/2008 | Okada et al. | |
| 2012/0080258 A1 * | 4/2012 | Tokioka | F16C 33/1065 180/444 |

FOREIGN PATENT DOCUMENTS

| | | | |
|---|---|---|---|
| JP | 2006-207639 A | | 8/2006 |
| JP | 2011174499 A | * | 9/2011 |

* cited by examiner

*Primary Examiner* — Laura Freedman
(74) *Attorney, Agent, or Firm* — Oliff PLC

(57) ABSTRACT

A steering system includes a steering operation shaft, a lower shaft, an upper shaft, and an intermediate shaft. The intermediate shaft includes a tubular member including a hollow portion; and a shaft member. An oil groove that retains lubricating oil is provided in a predetermined range in an axial direction of the intermediate shaft on at least one of an outer peripheral surface of the shaft member at a part housed in the hollow portion and an inner peripheral surface of the hollow portion of the tubular member. A sectional area of the oil groove in an upper shaft-side part of the predetermined range is larger than a sectional area of the oil groove in a lower shaft-side part of the predetermined range, the upper shaft-side part being located on a side of the upper shaft, and the lower shaft-side part being located on a side of the lower shaft.

7 Claims, 9 Drawing Sheets

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

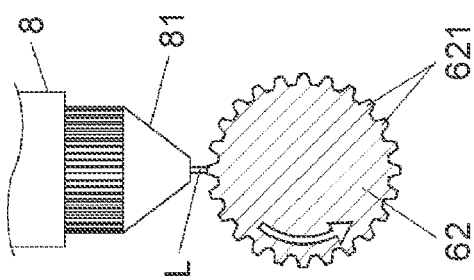
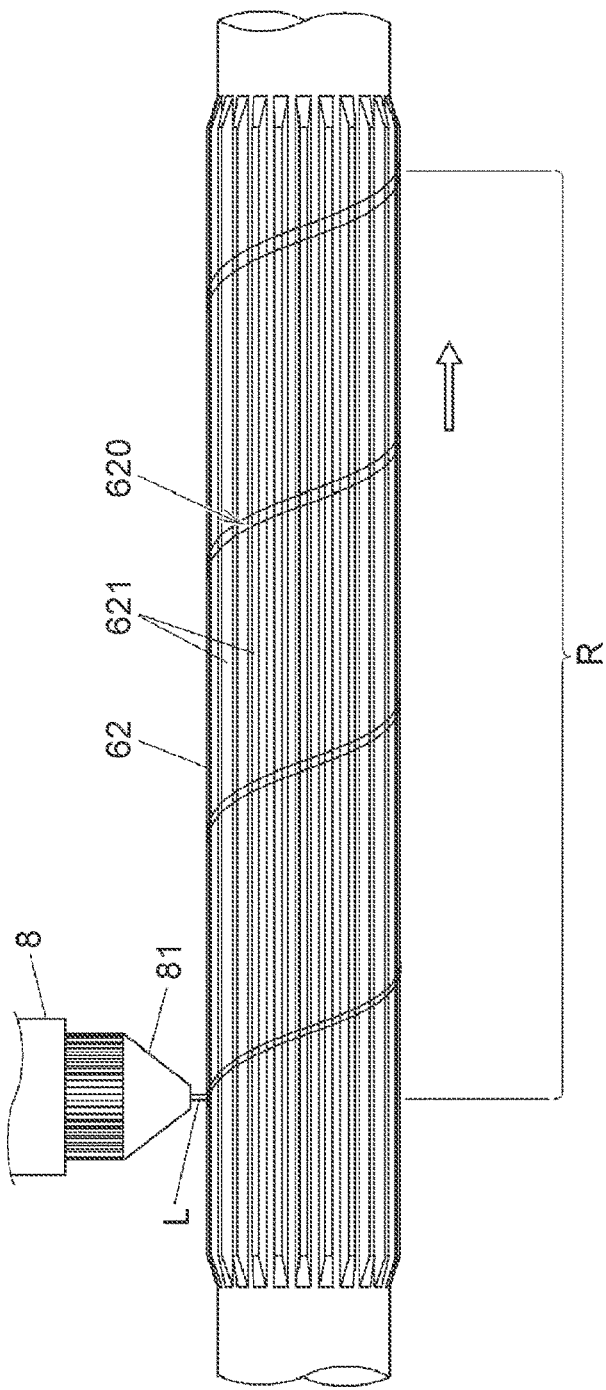

SECOND EMBODIMENT

THIRD EMBODIMENT

FOURTH EMBODIMENT

STEERING SYSTEM AND METHOD FOR MANUFACTURING THE SAME

CROSS-REFERENCE TO RELATED APPLICATION

This application claims priority to Japanese Patent Application No. 2020-008434 filed on Jan. 22, 2020, incorporated herein by reference in its entirety.

BACKGROUND

1. Technical Field

The disclosure relates to a steering system for a vehicle and a method for manufacturing the steering system.

2. Description of Related Art

Steering systems have been mounted on vehicles to turn steered wheels. The steering system includes a rack shaft, a pinion shaft, a steering shaft, and an intermediate shaft. The rack shaft has rack teeth. The pinion shaft has pinion teeth meshing with the rack teeth of the rack shaft. A steering wheel is attached to one end of the steering shaft. The intermediate shaft is disposed between the pinion shaft and the steering shaft and connected to the pinion shaft and the steering shaft via universal joints. In this steering system, the intermediate shaft may include a shaft member and a tubular member, which are spline-fitted to be axially movable relative to each other and not to be rotatable relative to each other (see, for example, Japanese Unexamined Patent Application Publication No. 2006-207639 (JP 2006-207639 A)).

The intermediate shaft of the steering system described in JP 2006-207639 A includes a male spline shaft serving as the shaft member, and a female spline shaft serving as the tubular member. The female spline shaft has a helical groove on its inner peripheral surface. This groove functions as an oil reservoir. Every time the female spline shaft and the male spline shaft slide against each other, lubricating oil is supplied from the groove to tooth flanks of the splines. Thus, lubricity can be secured.

SUMMARY

In the steering system described in JP 2006-207639 A, the end of the intermediate shaft on the side of the pinion shaft is located below the end of the intermediate shaft on the side of the steering shaft in a vertical direction. Even if the entire groove is filled with a uniform amount of lubricating oil along an extending direction of the groove at the time of manufacturing, the lubricating oil moves downward with an elapse of time due to influence of gravity. The amount of lubricating oil is insufficient in an upper side of the intermediate shaft. Thus, the lubricity may decrease.

The disclosure provides a steering system that can maintain good lubricity of an intermediate shaft over long-term use, and also provides a method for manufacturing the steering system.

A first aspect of the disclosure relates to a steering system including a steering operation shaft, a lower shaft, an upper shaft, and an intermediate shaft. The steering operation shaft has rack teeth and is configured to turn steered wheels of a vehicle by moving in an axial direction of the steering operation shaft. The lower shaft has pinion teeth meshing with the rack teeth. The upper shaft has one end to which a steering wheel is attached. The intermediate shaft is disposed between the lower shaft and the upper shaft, and connected to the lower shaft and the upper shaft via universal joints. The intermediate shaft includes a tubular member and a shaft member. The tubular member includes a hollow portion. The shaft member is disposed such that a part of the shaft member in a longitudinal direction of the shaft member is housed in the hollow portion. The shaft member and the tubular member are spline-fitted to be axially movable relative to each other and not to be rotatable relative to each other. An oil groove that retains lubricating oil in a form of a soft solid is provided in a predetermined range in an axial direction of the intermediate shaft on at least one of an outer peripheral surface of the shaft member at the part housed in the hollow portion and an inner peripheral surface of the hollow portion of the tubular member. A sectional area of the oil groove in an upper shaft-side part of the predetermined range is larger than a sectional area of the oil groove in a lower shaft-side part of the predetermined range, the upper shaft-side part being located on a side of the upper shaft, and the lower shaft-side part being located on a side of the lower shaft.

A second aspect of the disclosure relates to a method for manufacturing the steering system. The manufacturing method includes emitting a laser beam for forming the oil groove to the outer peripheral surface of the shaft member, and moving the shaft member in an axial direction of the shaft member relative to a laser head that is emitting the laser beam while rotating the shaft member about a central axis of the shaft member. The oil groove is formed into a helical shape in which a groove sectional area gradually increases from the lower shaft-side part to the upper shaft-side part.

In the steering system according to the first aspect of the disclosure, good lubricity of the intermediate shaft can be maintained for a long period. In the method for manufacturing the steering system according to the second aspect of the disclosure, the oil groove can be provided on the outer peripheral surface of the shaft member all over the predetermined range in the axial direction through one operation of laser beam machining.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7A is an explanatory drawing illustrating a step of forming the oil groove on the outer peripheral surface of the shaft member by laser beam machining;

FIG. 7B is an explanatory drawing illustrating the step of forming the oil groove on the outer peripheral surface of the shaft member by laser beam machining;

DETAILED DESCRIPTION OF EMBODIMENTS

First Embodiment

A first embodiment of the disclosure is described with reference to FIG. 1 to FIGS. 7A and 7B. The following embodiments are described as specific examples of the disclosure. The technical scope of the disclosure is not limited to those specific examples.

Figure 1:
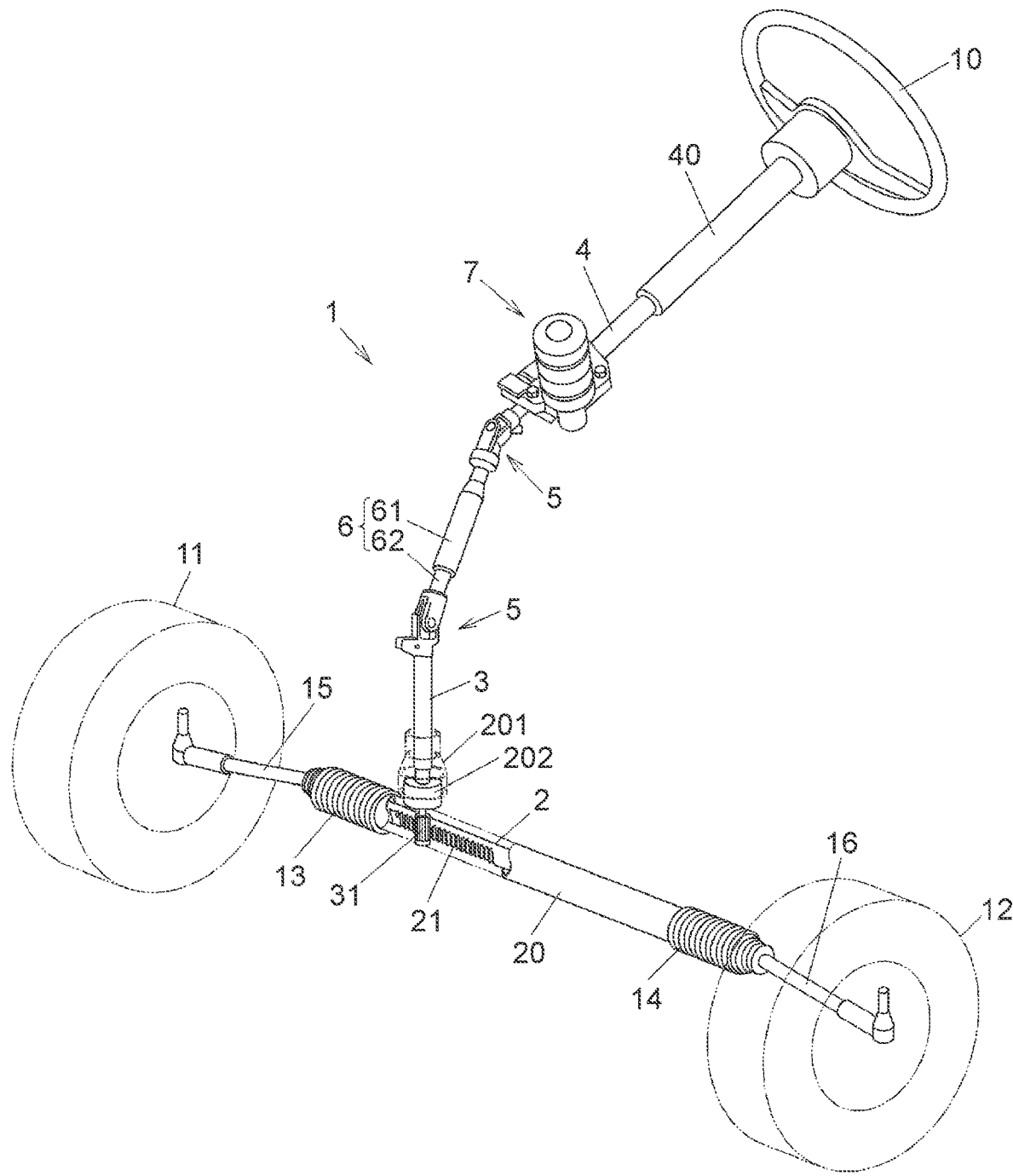
FIG. 1 is a schematic structural view illustrating a steering system according to embodiments of the disclosure.

FIG. 1 is a schematic structural view illustrating a steering system according to embodiments of the disclosure. The steering system is mounted on a vehicle to turn right and left front wheels serving as steered wheels in response to a driver's steering operation for a steering wheel. A specific example of the steering system according to the embodiments of the disclosure is described below with reference to symbols assigned to elements in the drawings. In the following description, terms "up" and "down" refer to up and down in a vertical direction in a state in which the steering system is mounted on the vehicle.

Overall Structure of Steering System

A steering system 1 includes a rack shaft 2, a pinion shaft 3, a steering shaft 4, an intermediate shaft 6, and a steering assist apparatus 7. The rack shaft 2 serves as a steering operation shaft having rack teeth 21. The pinion shaft 3 serves as a lower shaft having pinion teeth 31 meshing with the rack teeth 21. The steering shaft 4 serves as an upper shaft, and a steering wheel 10 is attached to one end of the steering shaft 4. The intermediate shaft 6 is disposed between the pinion shaft 3 and the steering shaft 4 and connected to the pinion shaft 3 and the steering shaft 4 via a pair of universal joints 5. The steering assist apparatus 7 generates a steering assist force to assist a steering operation for the steering wheel 10. The steering shaft 4 is rotatably supported by a tubular steering column 40.

The rack shaft 2 extends in a vehicle width direction, and is housed in a housing 20. The housing 20 is elastically supported on a vehicle body via mount bushes (not illustrated). Bellows 13 and 14 each having an accordion structure are respectively attached to both ends of the housing 20. In the bellows 13 and 14, right and left tie rods 15 and 16 are pivotably coupled to both ends of the rack shaft 2 via ball joints (not illustrated), respectively. The rack shaft 2 moves in its axial direction along the vehicle width direction to turn right and left front wheels 11 and 12 via the right and left tie rods 15 and 16, respectively.

The pinion shaft 3 is rotatably supported by a bearing 202 in a cover 201 attached to the housing 20. When the steering wheel 10 is steered, a steering force is transmitted to the pinion shaft 3 via the steering shaft 4 and the intermediate shaft 6, and the rack shaft 2 moves in its axial direction. In this embodiment, the steering assist apparatus 7 is disposed to apply a steering assist force to the steering shaft 4, and generates a steering assist force based on a detection value from a torque sensor configured to detect a torsion amount of a torsion bar provided on the steering shaft 4. The steering assist apparatus may be disposed to apply the steering assist force to the pinion shaft 3 or the rack shaft 2.

Figure 2:
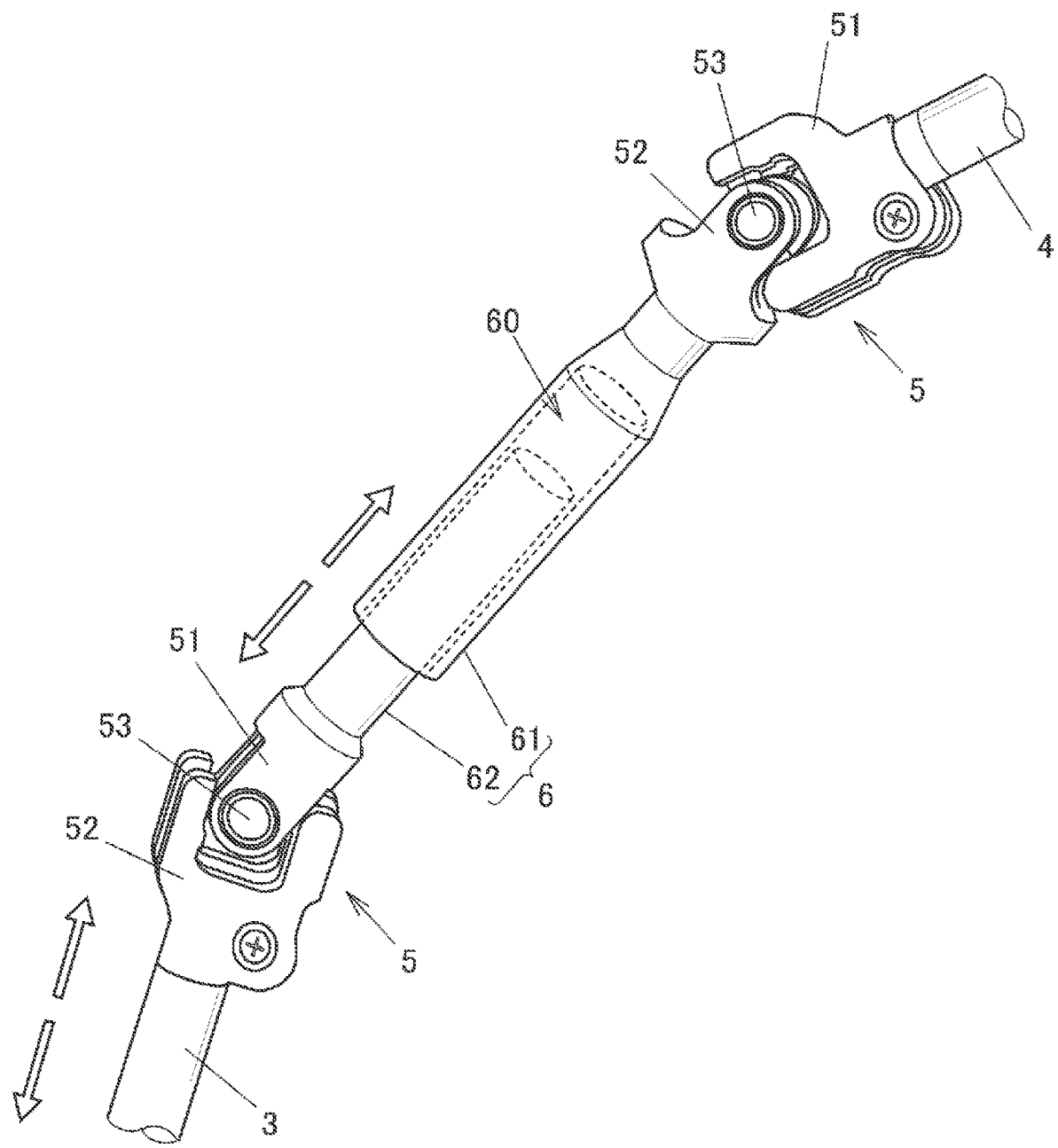
FIG. 2 is a structural view illustrating an intermediate shaft together with universal joints, a part of a steering shaft, and a part of a pinion shaft.

FIG. 2 is a structural view illustrating the intermediate shaft 6 together with the universal joints 5 at its both ends, a part of the steering shaft 4, and a part of the pinion shaft 3. The intermediate shaft 6 is inclined with respect to a vertical direction and a horizontal direction, and transmits, from the steering shaft 4 to the pinion shaft 3, a rotational force caused by the steering force applied to the steering wheel 10 and the steering assist force of the steering assist apparatus 7.

Each universal joint 5 is a Cardan joint, and includes an input yoke 51, an output yoke 52, and a joint spider 53. The intermediate shaft 6 includes a tubular member 61 and a shaft member 62. The tubular member 61 includes a hollow portion 60. A part of the shaft member 62 in its longitudinal direction is housed in the hollow portion 60. In this embodiment, the tubular member 61 is located above the shaft member 62, the upper end of the tubular member 61 is coupled to the end of the steering shaft 4 by one universal joint 5, and the lower end of the shaft member 62 is coupled to the end of the pinion shaft 3 by the other universal joint 5.

The tubular member 61 and the shaft member 62 are spline-fitted to be axially movable relative to each other and not to be rotatable relative to each other. The hollow portion 60 is open downward. The shaft member 62 is housed in the hollow portion 60 from a bottom toward a top of the tubular member 61.

When the front wheels 11 and 12 move in an up-and-down direction relative to the vehicle body while the vehicle is traveling, the pinion shaft 3 slightly moves in the up-and-down direction together with the rack shaft 2 in response to the movement of the front wheels 11 and 12. Along with the movement of the pinion shaft 3, the shaft member 62 moves in the up-and-down direction relative to the tubular member 61. Therefore, the fitting length, by which the tubular member 61 and the shaft member 62 of the intermediate shaft 6 are fitted to each other, is changed, and the length of the intermediate shaft 6 between the upper end on the side of the steering shaft 4 and the lower end on the side of the pinion shaft 3 is variable. In FIG. 2, arrows indicate moving directions of the pinion shaft 3 and the shaft member 62.

Figure 3:
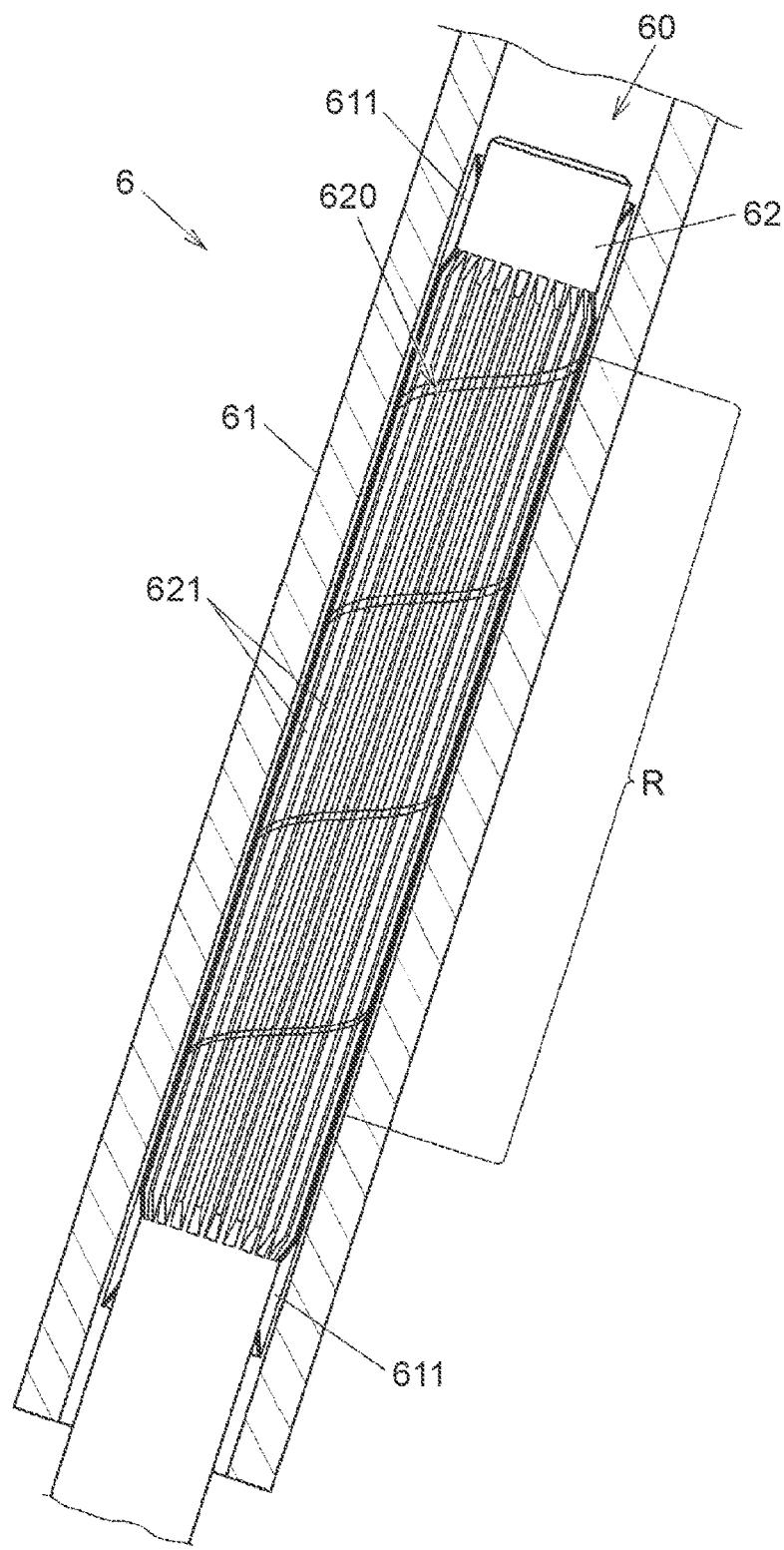
FIG. 3 is a structural view illustrating a shaft member housed in a hollow portion together with a section of a tubular member.

FIG. 3 is a structural view illustrating the shaft member 62 housed in the hollow portion 60 together with a section of the tubular member 61. A plurality of inner peripheral spline protrusions 611 extending in an axial direction of the tubular member 61 is formed on the inner peripheral surface of the hollow portion 60 of the tubular member 61. A plurality of outer peripheral spline protrusions 621 extending in an axial direction of the shaft member 62 is formed on the outer peripheral surface of the shaft member 62. The tubular member 61 and the shaft member 62 are axially movable relative to each other and not rotatable relative to each other due to engagement between the inner peripheral spline protrusions 611 and the outer peripheral spline protrusions 621 in a circumferential direction.

Figure 4:
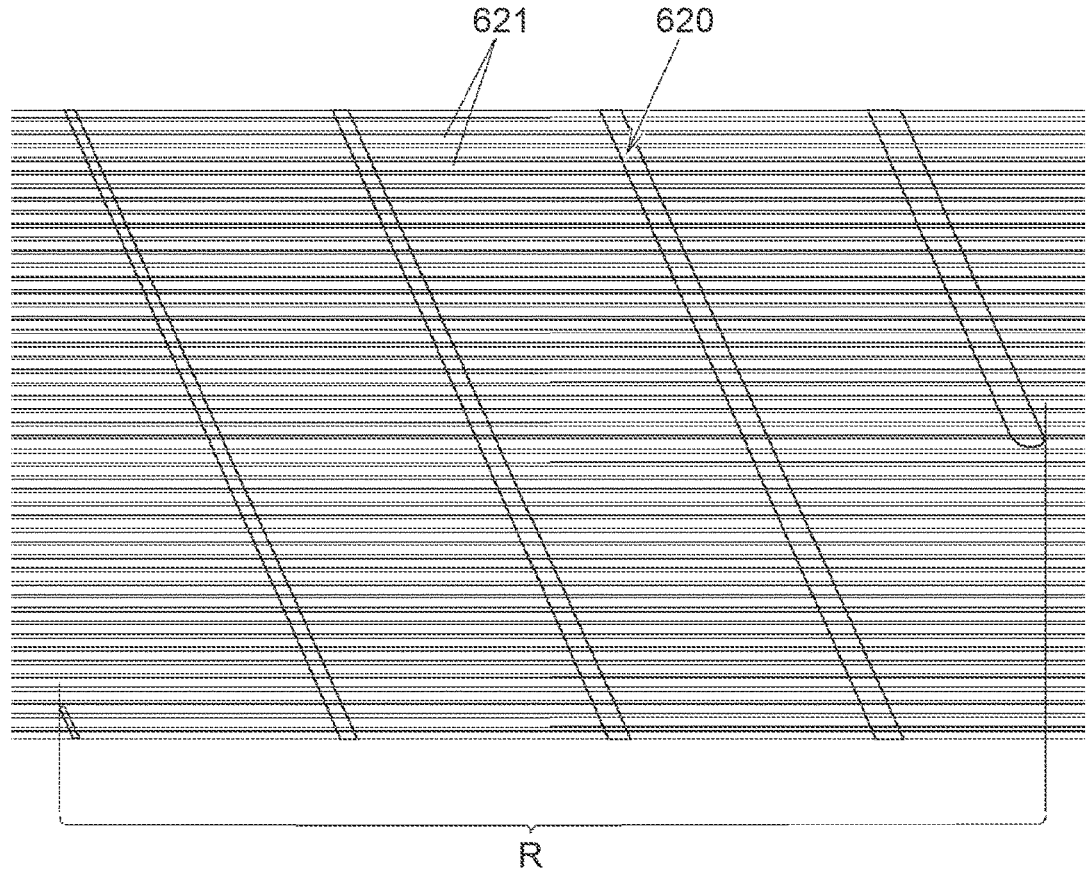
FIG. 4 is a planar development view of the outer peripheral surface of the shaft member at a part where a plurality of outer peripheral spline protrusions is formed.

The outer peripheral spline protrusions 621 are formed on the outer peripheral surface of the shaft member 62 at a part housed in the hollow portion 60. On the outer peripheral surface of the shaft member 62 at the part where the outer peripheral spline protrusions 621 are formed, an oil groove 620 is formed in a predetermined range in the axial direction. The oil groove 620 retains grease serving as lubricating oil in the form of a soft solid. In FIG. 3, FIG. 4, and FIG. 7A, which will be described later, the predetermined range is represented by a reference symbol "R". In this embodiment, the oil groove 620 is helically formed to extend in a direction inclined with respect to the axial direction. In FIG. 3, illustration of the grease retained in the oil groove 620 is omitted.

Figure 5A:
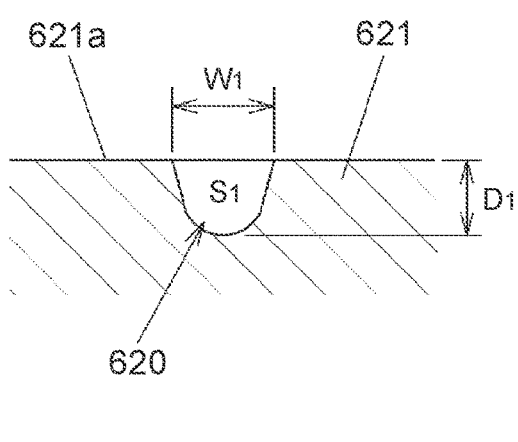
FIG. 5A is a sectional view of a periphery of an oil groove in a section orthogonal to an extending direction of the oil groove.
Figure 5B:
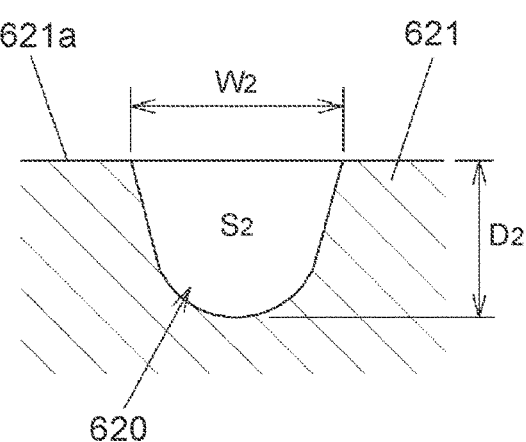
FIG. 5B is a sectional view of a periphery of the oil groove in a section orthogonal to the extending direction of the oil groove.
Figure 6:
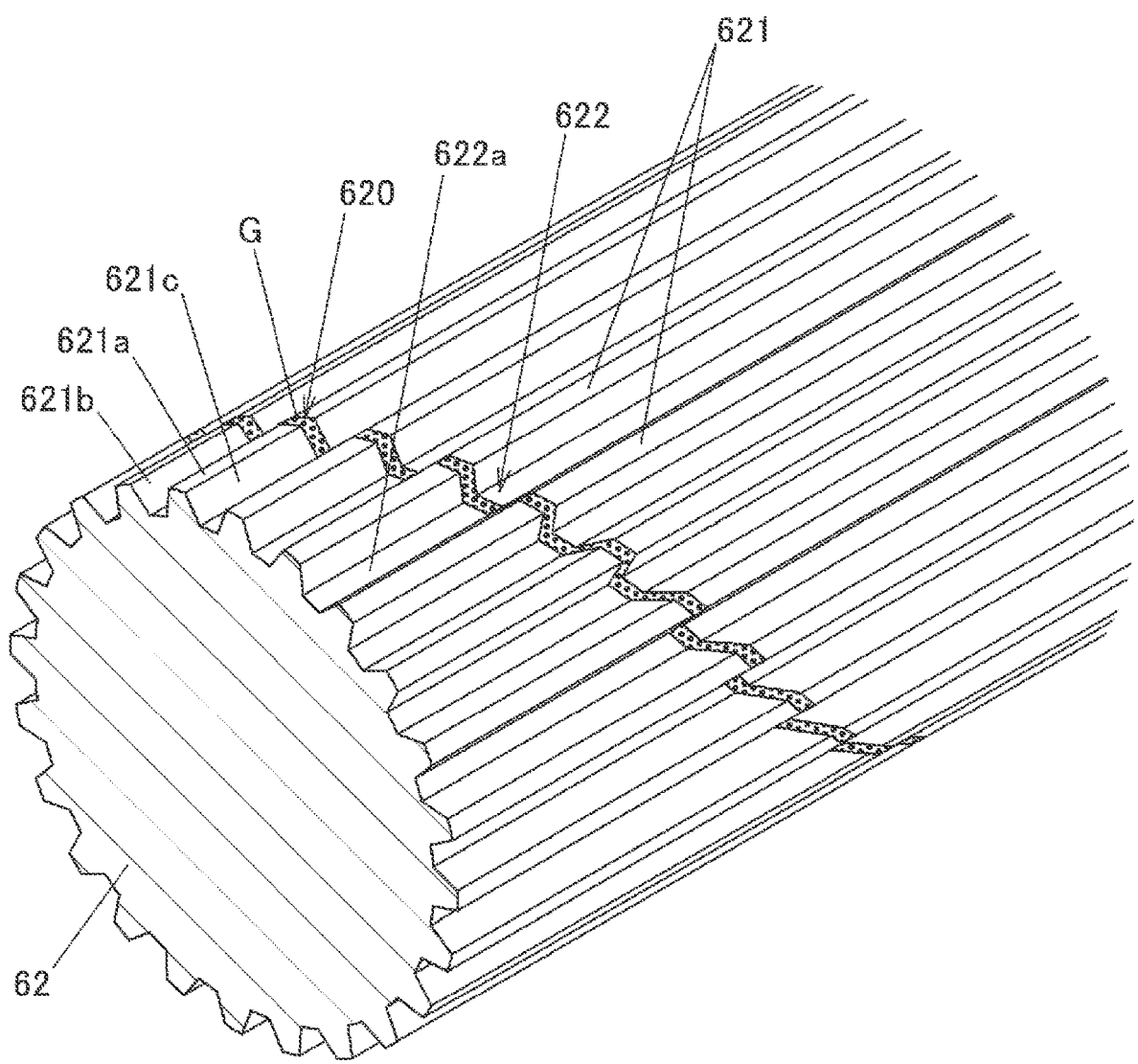
FIG. 6 is an enlarged perspective sectional view illustrating a part of the shaft member in its axial direction.

FIG. 4 is a planar development view of the outer peripheral surface of the shaft member 62 at the part where the outer peripheral spline protrusions 621 are formed. FIG. 5A is a sectional view of a periphery of the oil groove 620 in a section orthogonal to the extending direction of the oil groove 620 (i.e., the direction in which the oil groove 620 extends). FIG. 5B is also a sectional view of a periphery of the oil groove 620 in a section orthogonal to the extending direction of the oil groove 620. FIG. 6 is an enlarged perspective sectional view illustrating a part of the shaft member 62 in its axial direction.

The oil groove 620 is formed in the predetermined range R in the axial direction as illustrated in FIG. 4. The groove sectional area gradually increases from the lower end on the side of the pinion shaft 3 to the upper end on the side of the steering shaft 4. In other words, the oil groove 620 has a tapered shape in which the groove sectional area gradually decreases from the upper end to the lower end in the predetermined range R.

FIG. 5A illustrates a section of the oil groove 620 at the lower end in the predetermined range R. FIG. 5B illustrates a section of the oil groove 620 at the upper end in the predetermined range R. As illustrated in FIG. 5A and FIG. 5B, the groove width of the oil groove 620 gradually increases from $W_1$ at the lower end to $W_2$ at the upper end, and the depth of the oil groove 620 gradually increases from $D_1$ at the lower end to $D_2$ at the upper end. Thus, the groove sectional area of the oil groove 620 gradually increases from the lower end to the upper end, that is, from a sectional area $S_1$ at the lower end in the predetermined range R to a sectional area $S_2$ at the upper end in the predetermined range R.

As illustrated in FIG. 6, the oil groove 620 is filled with and retains grease G. Each outer peripheral spline protrusion 621 has a trapezoidal shape in a section perpendicular to the axial direction. The oil groove 620 is continuously (seamlessly) formed on a top surface (distal end surface) 621a and side surfaces 621b and 621c of each outer peripheral spline protrusion 621 and a groove bottom 622a of a groove portion 622 formed between the outer peripheral spline protrusions 621.

The grease G retained in the oil groove 620 is supplied to sliding portions between the inner peripheral spline protrusions 611 and the outer peripheral spline protrusions 621 to smooth relative axial movement between the tubular member 61 and the shaft member 62. A lower part of the grease G that fills the oil groove 620 is likely to flow out of the oil groove 620 due to gravity received from an upper part of the grease G. A space is formed after the grease G flows out of the oil groove 620, and the grease G located at a part of the oil groove 620 above the space flows into the space. In this manner, the grease G that fills the oil groove 620 at the time of manufacturing the steering system 1 gradually moves downward with an elapse of time.

In this case, it is assumed that the sectional area of the entire oil groove 620 is constant in its extending direction. In a lower side of the predetermined range R, the grease G supplied from the oil groove 620 may cause excessive supply of the lubricating oil to the sliding portions between the inner peripheral spline protrusions 611 and the outer peripheral spline protrusions 621. In an upper side of the predetermined range R, lubrication failure may occur due to deficiency of the grease G.

In this embodiment, the sectional area of the oil groove 620 in the upper side of the predetermined range R is made larger than the sectional area of the oil groove 620 in the lower side of the predetermined range R. Therefore, the amount of the grease G to be supplied from the oil groove 620 is reduced in the lower side of the predetermined range R, and the amount of the grease G is secured in the upper side of the predetermined range R to prevent oil deficiency, thereby maintaining the smooth sliding between the inner peripheral spline protrusions 611 and the outer peripheral spline protrusions 621 all over the predetermined range R. According to this embodiment, good lubricity of the intermediate shaft 6 can be maintained over long-term use.

Method for Manufacturing Intermediate Shaft 6

Next, a method for manufacturing the intermediate shaft 6 is described with reference to FIG. 7A and FIG. 7B. The shaft member 62 of the intermediate shaft 6 is obtained by forming the outer peripheral spline protrusions 621 on a columnar workpiece by, for example, broaching and then forming the oil groove 620 by laser beam machining. Then, the intermediate shaft 6 is obtained by filling the oil groove 620 with the grease G and inserting the shaft member 62 into the hollow portion 60 of the tubular member 61 having the hollow portion 60 and the inner peripheral spline protrusions 611 formed in advance.

FIG. 7A illustrates a step of forming the oil groove 620 on the outer peripheral surface of the shaft member 62 by laser beam machining. FIG. 7B also illustrates the step of forming the oil groove 620 on the outer peripheral surface of the shaft member 62 by laser beam machining. FIG. 7A illustrates the shaft member 62 viewed in its radial direction. FIG. 7B illustrates the shaft member 62 viewed in its axial direction. The laser beam machining is performed by moving the shaft member 62 in its axial direction relative to a laser head 8 while rotating the shaft member 62 about its central axis. A laser beam L is emitted from a nozzle 81 of the laser head 8 in a direction perpendicular to the central axis of the shaft member 62, and an assist gas is also jetted from the nozzle 81. In FIG. 7A, an arrow indicates a direction of movement of the shaft member 62 relative to the laser head 8. In FIG. 7B, an arrow indicates a direction of rotation of the shaft member 62.

The intensity of the laser beam L to be radiated onto the outer peripheral surface of the shaft member 62 is adjusted to a high level in the upper side of the predetermined range R and to a low level in the lower side of the predetermined range R. By changing the intensity of the laser beam L, the depth of the oil groove 620 can be changed. The groove width of the oil groove 620 can be changed by changing a focal point of the laser beam L. When the laser beam machining is performed from the upper end to the lower end in the predetermined range R as illustrated in FIG. 7A, the intensity of the laser beam L is reduced gradually. When the laser beam machining is performed from the lower end to the upper end in the predetermined range R, the intensity of the laser beam L is increased gradually.

According to this machining method, the oil groove 620 can be formed on the outer peripheral surface of the shaft member 62 all over the predetermined range R in the axial direction through one operation of laser beam machining. In this embodiment, description is provided on the case where one oil groove 620 is helically formed on the outer peripheral surface of the shaft member 62. When a plurality of oil grooves 620 is helically formed, it is appropriate to arrange as many laser heads 8 as the oil grooves 620 around the shaft member 62. Thus, the oil grooves 620 can be simultaneously formed on the outer peripheral surface of the shaft member 62.

In this embodiment, description is provided on the case where the sectional area of the oil groove 620 gradually (continuously) changes. The sectional area of the oil groove 620 may be changed stepwise. For example, when the sectional area of the oil groove 620 is changed in three steps, the sectional area at the center of the predetermined range R in the axial direction is made smaller than the sectional area at the upper end and larger than the sectional area at the lower end.

Second Embodiment

Figure 8:
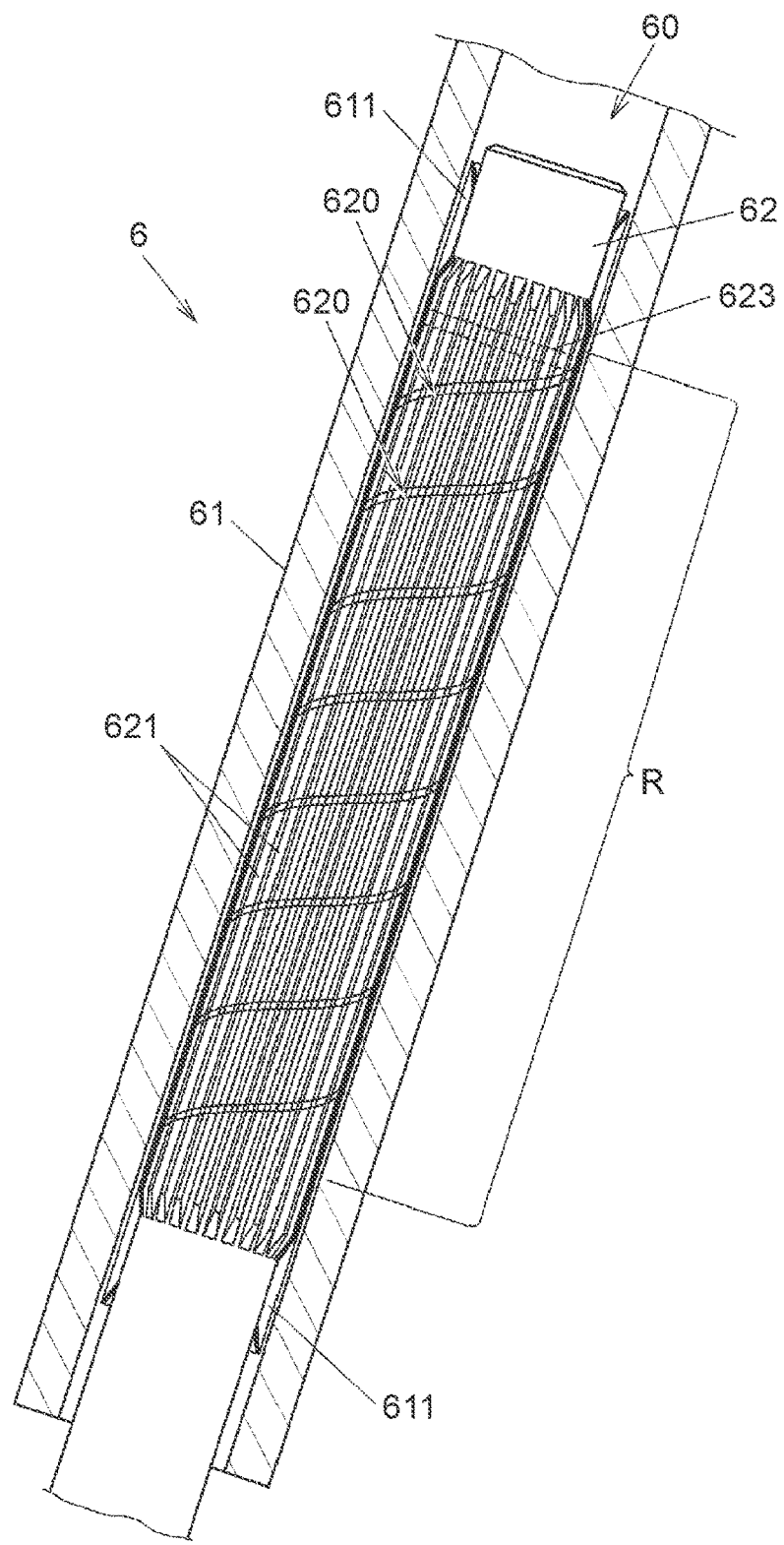
FIG. 8 is a structural view illustrating an example of the structure of a shaft member according to a second embodiment together with the tubular member.

Next, a second embodiment of the disclosure is described with reference to FIG. 8. FIG. 8 is a structural view illustrating an example of the structure of a shaft member 62 according to the second embodiment together with the section of the tubular member 61. In this embodiment, the shaft member 62 has an oil hole 623 extending in a direction intersecting the central axis of the shaft member 62. The oil hole 623 communicates with the oil groove 620.

In the structural example illustrated in FIG. 8, the oil hole 623 extends through the shaft member 62 in its radial direction, and both ends of the oil hole 623 communicate with the oil groove 620. More specifically, two oil grooves 620 are helically formed on the outer peripheral surface of the shaft member 62. One end of the oil hole 623 communicates with the upper end of one oil groove 620, and the other end of the oil hole 623 communicates with the upper end of the other oil groove 620.

By forming the oil hole 623 in the shaft member 62, the grease retained in the oil hole 623 is supplied to the upper end of the oil groove 620 when the grease at the upper end of the oil groove 620 flows downward. Therefore, oil deficiency is suppressed. Further, the oil hole 623 extends through the shaft member 62 in its radial direction, and both ends of the oil hole 623 communicate with the oil grooves 620. Therefore, the grease is supplied to the oil groove 620 from one end of the oil hole 623 that is located on a lower side in the vertical direction out of the two ends of the oil hole 623 (i.e., from one end of the oil hole 623 that is located below the other end of the oil hole 623 in the vertical direction).

The end of the oil hole 623 that is located on the lower side out of the two ends of the oil hole 623 (i.e., the end of the oil hole 623 that is located below the other end of the oil hole 623) changes depending on the rotational position of the steering wheel 10. Therefore, a specific end of the oil hole 623 is not always located on the lower side out of the two ends of the oil hole 623. That is, one end is located on the lower side at one timing, and the other end is located on the lower side at another timing. Thus, the grease can be supplied to the oil grooves 620 from the two ends of one oil hole 623.

In the structural example illustrated in FIG. 8, description is provided on the case where the two oil grooves 620 are formed on the outer peripheral surface of the shaft member 62 and the oil hole 623 is provided between the upper ends of the two oil grooves 620 to extend through the shaft member 62 in its radial direction. The disclosure is not limited to this case. One oil groove 620 may be formed on the outer peripheral surface of the shaft member 62, and the oil hole 623 may be formed to communicate with the oil groove 620. In this case, the oil hole 623 may be a blind hole that does not extend through the shaft member 62.

When the oil hole 623 is a through-hole, both ends of the oil hole 623 may communicate with two parts of one helical oil groove 620. In this case, in order not to influence the strength of the shaft member 62 due to an excessive increase in the size of the oil hole 623, it is desirable that the pitch of the helix of the oil groove 620 should be reduced or the oil hole 623 should be an elongated hole that is long in the axial direction to cause both ends of the oil hole 623 to communicate with the oil groove 620.

Third Embodiment

Figure 9:
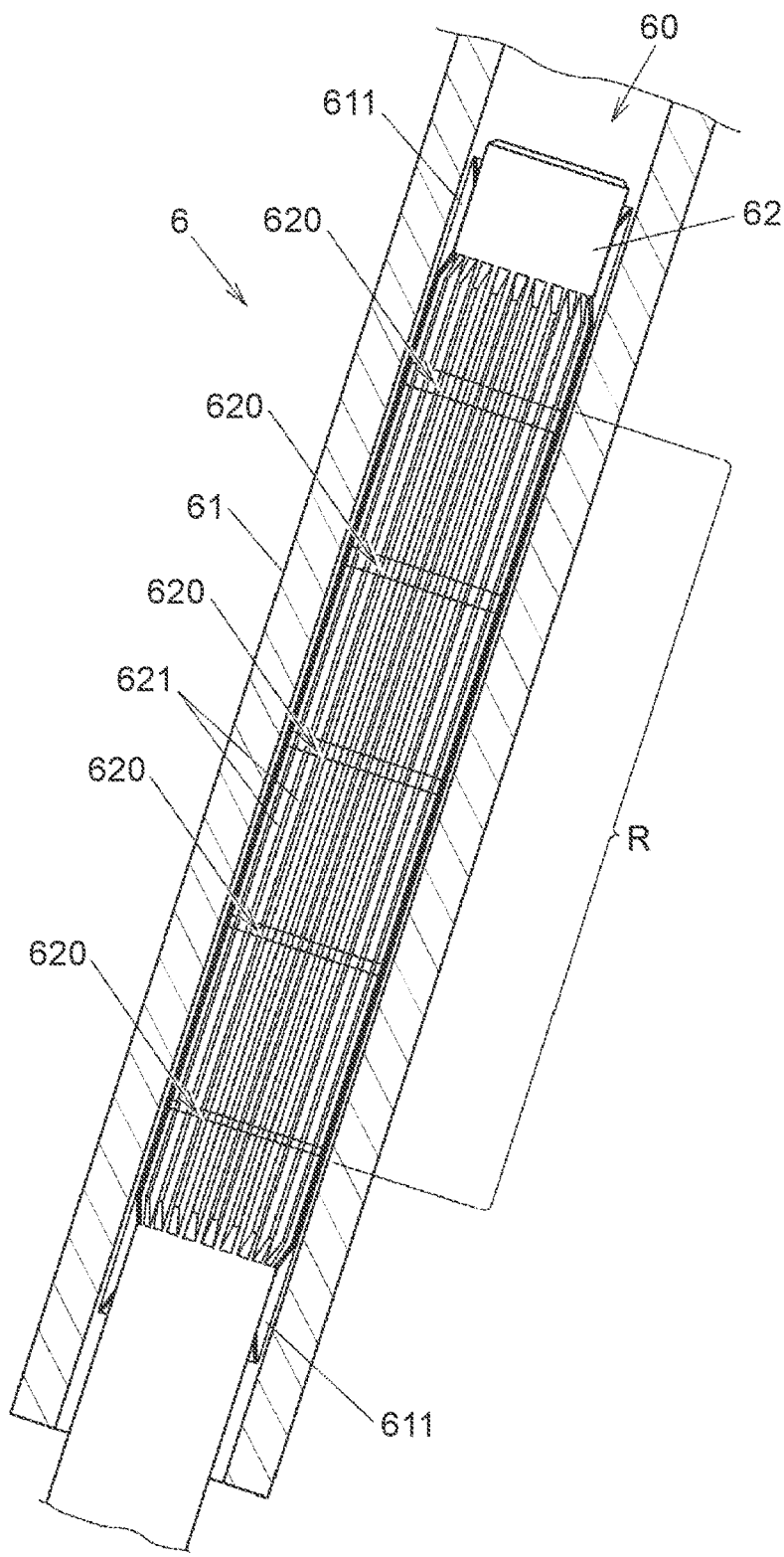
FIG. 9 is a structural view illustrating an example of the structure of a shaft member according to a third embodiment together with the tubular member.

Next, a third embodiment of the disclosure is described with reference to FIG. 9. FIG. 9 is a structural view illustrating an example of the structure of a shaft member 62 according to the third embodiment together with the section of the tubular member 61. In this embodiment, a plurality of oil grooves 620 is formed such that each grooves 620 has an annular shape in the predetermined range R in the axial direction of the shaft member 62.

FIG. 9 illustrates a case where five oil grooves 620 each extending in the circumferential direction are formed at regular intervals (i.e., at equal intervals) in the axial direction. The sectional area of each of the five oil grooves 620 is set such that the sectional area of the oil groove 620 is larger as the oil groove 620 is located closer to the upper end. That is, the sectional area of the oil groove 620 located closer to the upper end is larger among the sectional areas of the five oil grooves 620. In other words, the sectional area of each of the five oil grooves 620 is set such that the sectional area of the oil groove 620 increases as a distance between the oil groove 620 and the upper end decreases. With this structure, the amount of the grease in the lower side of the predetermined range R is not excessive and oil deficiency is suppressed in the upper side of the predetermined range R as well as in the first embodiment. Thus, good lubricity of the intermediate shaft 6 can be maintained for a long period.

Fourth Embodiment

Figure 10:
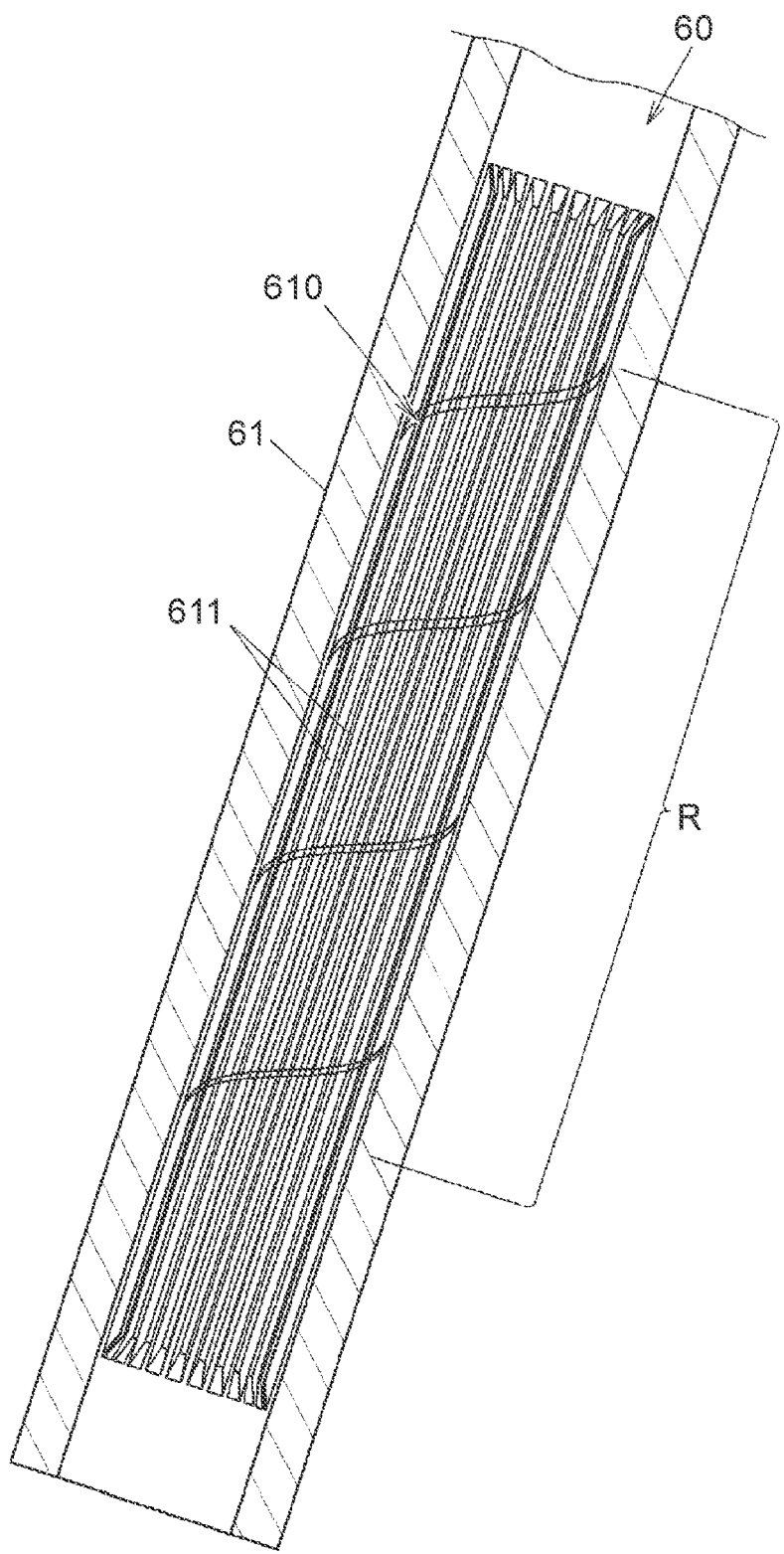
FIG. 10 is a sectional view illustrating a section of a tubular member according to a fourth embodiment.

Next, a fourth embodiment of the disclosure is described with reference to FIG. 10. FIG. 10 is a sectional view illustrating a section of a tubular member 61 according to this embodiment. In the first to third embodiments, description is provided on the case where the oil groove 620 is formed on the outer peripheral surface of the shaft member 62. In this embodiment, an oil groove 610 is formed in the predetermined range R in the axial direction on the inner peripheral surface of the hollow portion 60 of the tubular member 61.

In the structural example of FIG. 10, one oil groove 610 is formed on the inner peripheral surface of the hollow portion 60, and has a helical shape in which the groove sectional area of the oil groove 610 gradually increases from the lower side to the upper side. The disclosure is not limited to this case. A plurality of oil grooves 610 may be helically formed on the inner peripheral surface of the hollow portion 60, or a plurality of annular oil grooves 610 may be formed to extend in the circumferential direction.

When the oil groove 610 is formed on the inner peripheral surface of the hollow portion 60 of the tubular member 61, good lubricity of the intermediate shaft 6 can be maintained for a long period as well as in the first and third embodiments.

Although the disclosure is described above based on the embodiments, the embodiments are not intended to limit the disclosure.

The embodiments of the disclosure may be modified as appropriate by partially omitting, adding, or replacing components without departing from the scope of the disclosure. For example, the oil grooves 610 and 620 may be formed by any machining instead of the laser beam machining. Further, the inner peripheral surface of the tubular member 61 or the outer peripheral surface of the shaft member 62 may be coated with a resin.

The oil groove 610 may be formed on the inner peripheral surface of the tubular member 61, and the oil groove 620 may be formed on the outer peripheral surface of the shaft member 62. In this case, it is desirable that the two oil grooves 610 and 620 should be formed without overlapping each other so that the corners of the oil grooves 610 and 620 are not caught on each other when the inner peripheral spline protrusions 611 and the outer peripheral spline protrusions 621 slide against each other.

What is claimed is:

1. A steering system comprising:
    a steering operation shaft having rack teeth and configured to turn steered wheels of a vehicle by moving in an axial direction of the steering operation shaft;
    a lower shaft having pinion teeth meshing with the rack teeth;
    an upper shaft having one end to which a steering wheel is attached; and
    an intermediate shaft disposed between the lower shaft and the upper shaft and connected to the lower shaft and the upper shaft via universal joints,
    wherein the intermediate shaft includes:
        a tubular member including a hollow portion; and
        a shaft member disposed such that a part of the shaft member in a longitudinal direction of the shaft member is housed in the hollow portion, the shaft member and the tubular member being spline-fitted to be axially movable relative to each other and not to be rotatable relative to each other,
    wherein an oil groove that retains lubricating oil in a form of a soft solid is provided in a predetermined range in an axial direction of the intermediate shaft on at least one of an outer peripheral surface of the shaft member at the part housed in the hollow portion and an inner peripheral surface of the hollow portion of the tubular member, and
    wherein a sectional area of the oil groove in an upper shaft-side part of the predetermined range is larger than a sectional area of the oil groove in a lower shaft-side part of the predetermined range, the upper shaft-side part being located on a side of the upper shaft, and the lower shaft-side part being located on a side of the lower shaft.

2. The steering system according to claim 1, wherein the oil groove has a helical shape in which a groove sectional area gradually increases from the lower shaft-side part to the upper shaft-side part.

3. A method for manufacturing the steering system according to claim 2, the method comprising
    emitting a laser beam for forming the oil groove to the outer peripheral surface of the shaft member, and moving the shaft member in an axial direction of the shaft member relative to a laser head that is emitting the laser beam while rotating the shaft member about a central axis of the shaft member.

4. The steering system according to claim 1, wherein:
    the oil groove includes a plurality of oil grooves provided in the predetermined range, and each of the plurality of oil grooves has an annular shape; and
    a sectional area of each of the plurality of oil grooves is set such that the sectional area of the oil groove increases as a distance between the oil groove and the upper shaft decreases.

5. The steering system according to claim 1, wherein the oil groove is provided on the outer peripheral surface of the shaft member.

6. The steering system according to claim 5, wherein the shaft member has an oil hole extending in a direction intersecting a central axis of the shaft member, and the oil hole communicates with the oil groove.

7. The steering system according to claim 6, wherein the oil hole extends through the shaft member, and both ends of the oil hole communicate with the oil groove.

* * * * *